(12) United States Patent
Welker et al.

(10) Patent No.: US 7,403,448 B2
(45) Date of Patent: Jul. 22, 2008

(54) STREAMER STEERING DEVICE ORIENTATION DETERMINATION APPARATUS AND METHODS

(75) Inventors: Kenneth E. Welker, Nesoya (NO); Erik Vigen, Honefoss (NO); Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 73 days.

(21) Appl. No.: 11/144,553

(22) Filed: Jun. 3, 2005

(65) Prior Publication Data

US 2006/0285434 A1    Dec. 21, 2006

(51) Int. Cl.
    *B63G 8/14*    (2006.01)
(52) U.S. Cl. .......................... 367/17; 114/245
(58) Field of Classification Search ............ 367/17, 367/21; 701/21; 114/244, 245
    See application file for complete search history.

(56) References Cited

U.S. PATENT DOCUMENTS

| | | | |
|---|---|---|---|
| 4,992,990 A | | 2/1991 | Langeland et al. |
| 6,011,752 A | * | 1/2000 | Ambs et al. ............... 367/17 |
| 6,470,246 B1 | * | 10/2002 | Crane et al. ............... 701/21 |
| 6,525,992 B1 | | 2/2003 | Olivier et al. |
| 6,671,223 B2 | | 12/2003 | Bittleston |

| | | |
|---|---|---|
| 2005/0188908 A1 | 9/2005 | Hillesund et al. |

FOREIGN PATENT DOCUMENTS

| | | |
|---|---|---|
| EP | 1 600 795 A2 | 11/2005 |
| GB | 2 400 662 A | 10/2004 |
| GB | 2 421 309 A | 6/2006 |
| WO | WO 96/21163 | 7/1996 |
| WO | WO 199828636 A1 | 7/1998 |
| WO | WO 200008906 A2 | 2/2000 |

OTHER PUBLICATIONS

UK Search Report dated Sep. 12, 2006, Application No. GB 0610412.9.

* cited by examiner

*Primary Examiner*—Mark Hellner
(74) *Attorney, Agent, or Firm*—Jeffrey L. Wendt; Liangang (Mark) Ye; Jeffrey E. Grriffin

(57) ABSTRACT

Apparatus and methods for enhancing knowledge of the angle of attack of a streamer steering device are described, one apparatus comprising a seismic streamer having an orientation member including a body and at least one control surface; a sensor of the body adapted to measure a parameter indicative of angle of attack of the body; and a controller for adjusting the control surface based on at least the measured parameter. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

19 Claims, 4 Drawing Sheets

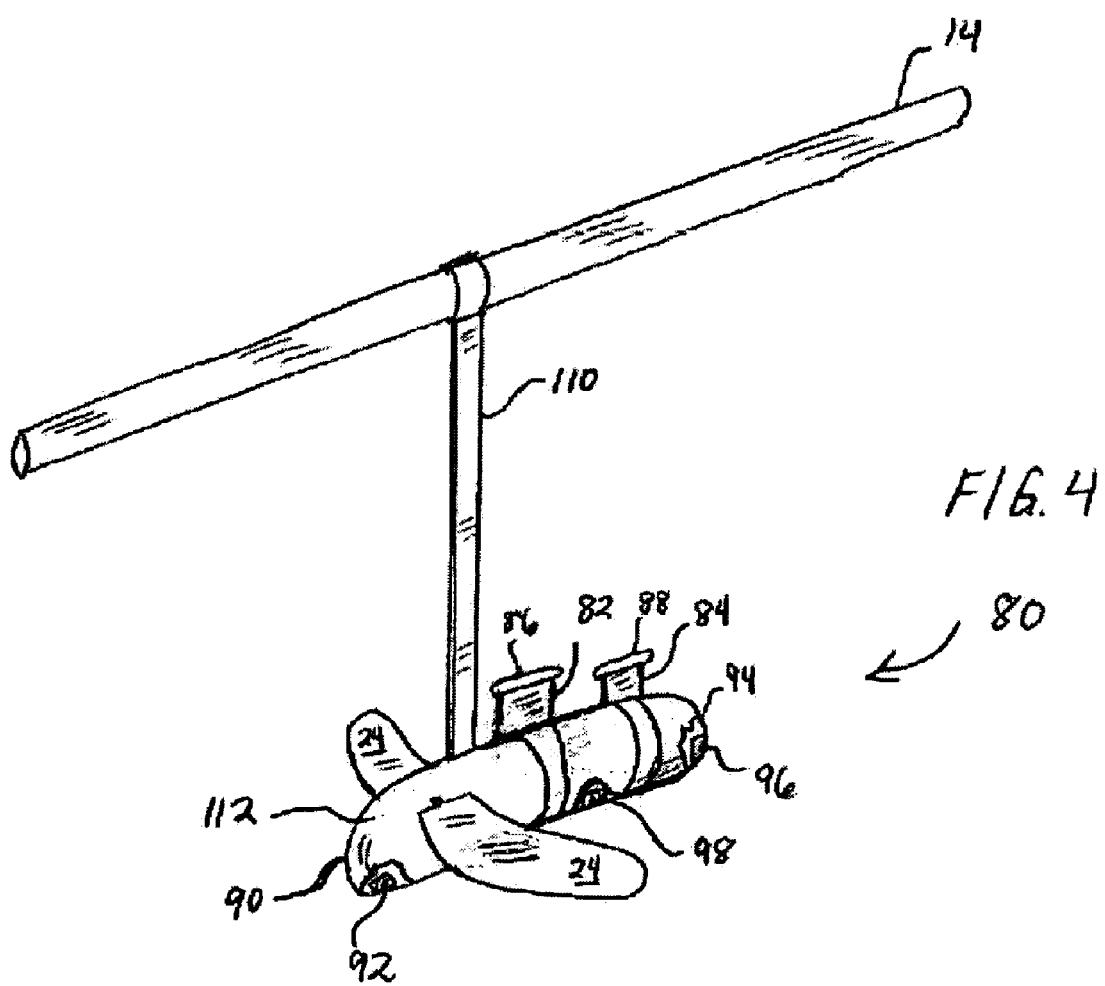

STREAMER STEERING DEVICE ORIENTATION DETERMINATION APPARATUS AND METHODS

BACKGROUND OF THE INVENTION

1. Field of Invention

The present invention relates to the field of marine seismic instrumentation and methods of using same. More specifically, the invention relates to apparatus and methods for improving knowledge of angle of attack of a seismic streamer steering device.

2. Related Art

Marine seismic exploration investigates and maps the structure and character of subsurface geological formations underlying a body of water. For large survey areas, seismic vessels tow one or more seismic sources and multiple seismic streamer cables through the water. The streamers may be positioned using controllable steerable birds, deflectors, steerable buoys, and the like. To position streamers most efficiently, knowledge of the angle of attack of the steerable devices is needed. Currently, this knowledge is obtained indirectly using estimates of varying precision and accuracy.

It would be an advance in the art if knowledge of the angle of attack of the streamer steering devices could be obtained directly.

SUMMARY OF THE INVENTION

In accordance with the present invention, apparatus and methods are described for measuring a parameter indicative of the angle of attack of a streamer steering device body, rather than estimating the angle. The systems and methods of the invention reduce or overcome problems with previous streamer steering positioning apparatus and methods. Apparatus and methods of the invention may be used to collect data in marine seismic surveys, for example 3D and 4D marine seismic surveys.

A first aspect of the invention are methods, one method comprising:

(a) measuring a parameter indicative of angle of attack of a streamer orientation member body; and (b) using at least the measured parameter to adjust one or more control surfaces of the orientation member.

As used herein "body" means a substantially rigid section whose geometry does not change significantly, as opposed to a flexible cable, for example. The body may be substantially solid, or may define an internal space, or have a portion of which defines an internal space capable of housing electronic, pneumatic, hydraulic or other functional components used in steering the orientation member and communicating with other seismic equipment, including computers. Methods of the invention include those wherein the measuring is selected from an acoustic method, a magnetic method, an inertial method, an inclination method, and combinations thereof. The orientation member may comprise a remotely controllable steerable bird having moveable fins for control surfaces. The fins may be removably attached to the body, and may be controlled independently. Other methods of the invention are those wherein the steerable bird comprises one or more acoustic sensors located within or on the body of the steerable bird, and the measuring is an acoustic method. The measuring may comprise measuring an ocean current vector and a vessel motion vector to find the water flow vector relative to the orientation member control surface. The steerable bird may comprise a rigid extension from the body having a known angle to and length from the body, the extension comprising one or more sensors located within or on the extension. The method may include measuring vertical orientation of the orientation member body, such as by measuring pressure differential on the body, measuring inclination of the body, or some combination thereof. The measuring may include using a tri-axial magnetometer removably attached to the body, measuring the magnetic field strength and direction relative to axes of the body, measuring the direction of an acoustic signal relative to the body axes, measuring a gravity vector relative to the body axes, and combinations of these. The gravity vector may be measured using a device selected from a tri-axial accelerometer, an inclinometer, a gimbaling system, pressure gauges, and combinations thereof, such as a gimbaled tri-axial accelerometer.

Another aspect of the invention are apparatus comprising:

(a) a seismic streamer having at least one orientation member including a body and at least one control surface;

(b) a sensor of the orientation member adapted to measure one or more parameter indicative of angle of attack of the body; and (c) a controller for adjusting the control surface based on at least the measured parameter.

Apparatus of the invention include those wherein the sensor is selected from an acoustic sensor, a magnetic sensor, an inertial sensor, an inclinometer, a pressure sensor, and combinations thereof. The acoustic sensor may comprise a receiver and transmitter, or a transducer combining the functions of receiver and transmitter. If used, the magnetic sensor may comprise a tri-axial magnetometer, and the inertial sensor may comprise a tri-axial accelerometer. Any of the sensors may be gimbaled. The orientation member may be a steerable bird wherein the body of the steerable bird is inline of the streamer, attached to the streamer, or hung from the streamer, and the control surface may comprise one or more movable, independently controllable fins.

Apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIG. 4 is a schematic perspective view of another apparatus of the present invention.

Figure 1:
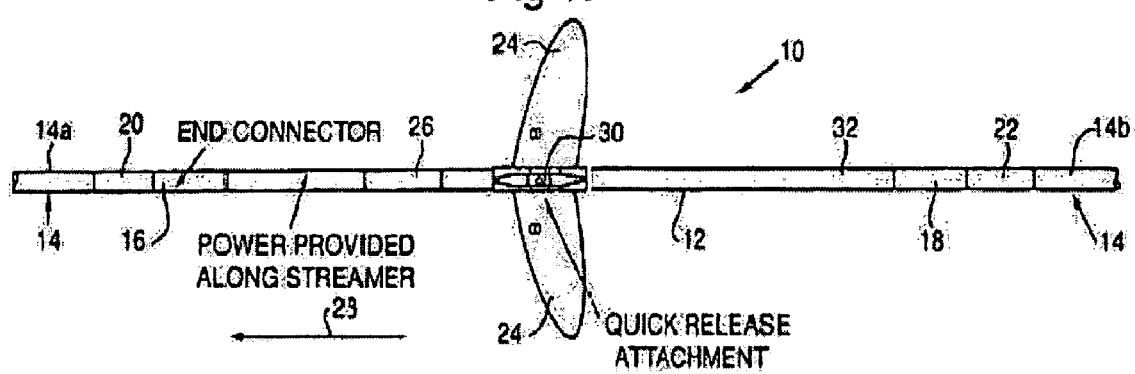
FIG. 1 is a schematic representation of a prior art orientation member useful in the present invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The phrase "orientation member" means a device capable of movements that may result in any one or multiple straight line or curved path movements of a streamer in 3-dimensions, such as lateral (horizontal), vertical up, vertical down, and combinations thereof. The terms and phrases "bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of the outer-most streamer, and other deflecting members, such as those that may be employed at the front end of seismic sources or source arrays, may function as orientation members in some embodiments, although they are primarily used to pull streamers and steer sources laterally with respect to direction of movement of a tow vessel.

The phrases "control vertical and horizontal position", "controlling vertical and horizontal position", "position controllable", "remotely controlling position" and the term "steering" are generally used interchangeably herein, although it will be recognized by those of ordinary skill in the art that "steering" usually refers to following a defined path, while "control vertical and horizontal position", "controlling vertical and horizontal position", "position controllable", and "remotely controlling position" could mean steering, but also include maintaining a relative position, for example, one streamer relative to a second or a third streamer, or one, a pair, or a triplet of streamers relative to one or more reference points, such as natural or man-made objects, or merely deflecting an object. These phrases also include repeating or duplicating a previous seismic shot path, so-called 4-D seismology, and include controlling position so that the streamers form a "V" or "W" cross-line geometry, or some other pattern. As "control vertical and horizontal position", "position controllable" and "controlling vertical and horizontal position" are somewhat broader terms than "steering", these terms are used herein, except when specific instances demand using more specific words.

The term "position", when used as a noun, is broader than "depth" or lateral movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation.

The term "control", used as a transitive verb, means to verify or regulate by comparing with a standard or desired value, and when used as a noun ("controller") means a mechanism that controls. Control may be open-loop, closed loop, feedback, feed-forward, cascade, adaptive, heuristic and combinations thereof.

The term "adjusting" means changing one or more parameters or characteristics in real-time or near-real-time. "Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after they are received by the next process in the decision line.

The present invention relates to various apparatus and methods for improving knowledge of the angle of attack for a streamer steering device. This knowledge may improve control of cross line force exerted by each steering device along the streamer. The invention couples instrumentation to the steering device body that gives the body orientation in a reference frame in which ocean current and vessel movement is known.

Horizontal and vertical control of streamers is typically provided today by orientation members, which may be of any type as explained herein, such as small hydrofoils or birds that can provide forces in the vertical and horizontal planes. Orientation members may be equally spaced along the length of the streamers, and may be clamped to streamers, hung from streamers, or inserted inline in streamers to provide the desired vertical and horizontal position control. Additional orientation members may be placed at intervals between main orientation members for supplemental position control, for example to reduce streamer "sagging" between locations where main orientation members are located on streamers. In some embodiments of the invention it may be possible to change the streamer configuration during the seismic survey using orientation members, optionally assisted by a winching system or other arrangement to alter the length of cables.

One type of orientation member which may be modified in accordance with the invention is described in commonly assigned U.S. Pat. No. 6,671,223, describing a steerable bird known under the trade designation "Q-FIN", available from WesternGeco LLC, Houston, Tex., that is designed to be electrically and mechanically connected in series (i.e., in line) with a streamer, or other steering devices are currently attached to seismic streamers to steer the streamers cross line for a desired shape, position, or both. Steering may be achieved through lift afforded by two independent wings of fins that rotate around an axis perpendicular to the wing axis controller body. A further description can be found in reference to FIG. 1. The streamer control device, or "bird", of FIG. 1 is indicated generally at 10, and comprises an elongate streamlined body 12 adapted to be mechanically and electrically connected in series in a multi-section marine seismic streamer 14 of the kind which is towed by a seismic survey vessel and which is used, in conjunction with a seismic source also towed by the vessel, to conduct seismic surveys, as briefly described hereinbefore. To permit such connection, each end of the body 12 is provided with a respective mechanical and electrical connector 16, 18, these connectors being complementary to, and designed to interconnect with, streamer end connectors 20, 22 respectively which are normally used to join together adjacent sections 14a and 14b of the streamer 14. The bird 10 is provided with two opposed control surfaces, or wings, 24, typically molded from a fiber-reinforced plastics material, which project horizontally outwardly from the body 12 and which are independently rotatable about a common axis extending substantially perpendicularly through the longitudinal axis of the body. Rotation of the wings 24 is effected under the control of a control system 26 sealingly housed within the body 12. The wings 24 are generally ogival (i.e., rounded) and swept back with respect to the direction of tow of the streamer 14 (which direction is indicated by the arrow 28), in order to reduce the possibility of debris becoming hooked on them. To facilitate their rapid removal and reattachment, the wings 24 are secured to body 12 by a quick-release attachment 30. As mentioned hereinbefore, the streamer 14 includes hydrophones distributed along its length; it also includes control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines are coupled together from the streamer section 14a to the streamer section 14b via respective corresponding lines 32 which extend through the body 12 of the bird 10 between the connectors 16, 18. Additionally, the control system 26 is connected to receive control signals and electric power from respective ones of the lines 32. The greater part of the length of the body 12 of the bird 10 is flexible, the only rigid parts being the connectors 20, 22, and a short central housing section which houses the control system 26 and from which the wings 24 project. This central housing section, which is made of aluminum or titanium and has holes passing longitudinally there through for the passage of Kevlar or other stress members which bear the longitudinal loads on the body 12, is kept as short as possible, typically around 40 cm, so that once the wings 24 have been detached from the body 12, the streamer 14 can be wound onto and unwound from the large drum used for storing the streamer, with the body 12 still connected in the streamer. The quick-release attachment 30 permits the removal and attachment of the wings 24 to be at least partly automated as the streamer 14 is reeled in and out during the survey.

In order to optimize the wing lift, and thus steer most efficiently, knowledge of the angle of attack of the body of the steering device is needed. The direction and speed of the water flow, (i.e., current relative to the wing) is necessary for knowing the angle of attack. Within a common absolute reference frame, such as the World Geodetic System-1984 (WGS-84) for example, the combined vectors for ocean current and vessel motion give the water flow vector. Estimates of varying precision and accuracy for the steering device body orientation exist. The body orientation uncertainty is due to at least two model errors; the streamer shape model between the steering devices and the unmodeled misalignment of the steering device relative to the longitudinal streamer axis.

Several methods can be used to give some advantage to steering devices in the absence of this information. The least precise is to assume the angle of attack does not change and use a reasonable value and accept the accompanying error. An improvement on this method is to assume the steering body is aligned with the streamer longitudinal axis and further to assume that the streamer is straight. A refinement again is to accept that the streamer is not straight and to use a function that approximates the streamer shape. These methods provide a more precise orientation estimate for the steering device than simply assuming the angle of attack does not change, however they are still estimates. Rather than with a model, the best way to determine this orientation is by measuring it. This invention describes how to do this through several measurement mechanisms: acoustically, with a magnetic compass, tri-axial magnetometers, inertial positioning devices, inclinometers, pressure gauges, and any combination of two or more of these techniques.

Figure 2:
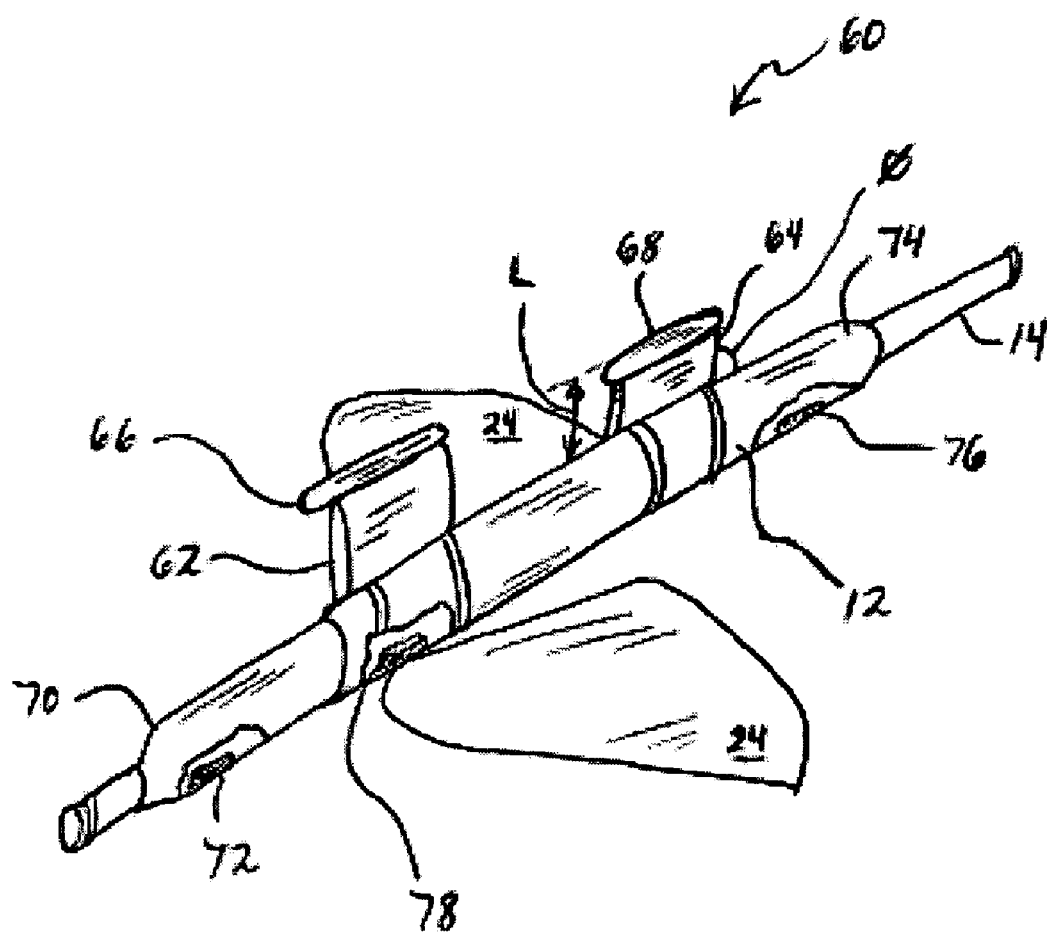
FIG. 2 is a schematic perspective view of an apparatus of the present invention.

FIG. 2 illustrates the steerable bird of FIG. 1 modified in accordance with one embodiment 60 of the invention, with portions cut away to reveal certain features. Illustrated in FIG. 2 are two members 62 and 64 extending away from steerable bird body 12 at a known distance L and known angle, $\phi$. Members 62 and 64 respectively support dual acoustic sensors 66 and 68. The steering device body 12 orientations may be determined since the length L and angle $\phi$ are known. Alternatively, the acoustic sensors 66 and 68 may each be inside of body 12 of steering device 60. The differenced measurements from the acoustic devices 66 and 68 provide information about one angle of orientation and combined with other information as explained below the complete set of all three attitude angles may be resolved and thus give the orientation of body 12, the steering device body to which wings 24 are attached. Steering device body 12 may be assumed to be nearly horizontal in the common reference frame or so near to horizontal that the error from the incorrect assumption is negligible. Additional instrumentation to determine the vertical orientation may be added in the form of two or more pressure sensors, depicted at 72 and 76. Pressure sensor 72 is shown located near a front end 70 of body 12, while pressure sensor 76 is shown illustrated near an aft end 74. Pressure sensors 72 and 76 could either provide absolute pressure or pressure differences to measure the validity of the assumption. An inclinometer, 78, in bird body 12 may provide equivalent information. FIG. 2 shows acoustic sensors and pressure sensors both aligned with the longitudinal axis, although there exist many combinations of sensors and sensing strategies to determine orientation. With an arrangement as illustrated in FIG. 2 it will also be required to have accelerometers or an inclinometer sensitive to the roll angle. This may also be true for the assumption of a nearly horizontal device as it may be a false assumption to neglect any twist. To generalize, one needs to measure three angles of orientation in a manner such that each of them have at least a component independent of the other two to ensure that all three degrees of freedom are fixed. This may be achieved by combining three of the simple measurements (any choice among acoustics, pressure and inclinometer) or combining a tri-axial magnetometer or a tri-axial accelerometer with one of the simple measurements. An inertial platform may be employed by itself. For higher accuracy, the position of the steering device must be known with greater precision. The required accuracy depends heavily on the types of measurements employed and the orientation accuracy needed, and it may vary from the meter level to the kilometer level.

As stated herein, one might use a gimbaled device. Using a gimbal is essentially the same as using an inclinometer. To borrow terminology from the inertial technology we may call the gimbaled device a "local level" system while the combination of the measuring device with an inclinometer may be analogous to a "strap down" system. In the "local level" case the compensation for the inclination is done automatically in an analogue manner while in "strap down" the compensation must be done analytically.

As stated there are many possible existing and foreseeable combinations of measurement techniques and strategies, and these variations are considered within the scope of the invention.

As an alternative to one or more of the acoustic sensors, inclinometers, and pressures sensors depicted in FIG. 2, one or more magnetic compasses positioned in steering device body 12 may provide the orientation of body 12. The compass must be calibrated for the magnetic disturbance caused by the metal in steering device 60.

Another alternative to pressure sensors, inclinometers, acoustic sensors, and magnetic compasses is a tri-axial magnetometer fixed to body 12. A tri-axial magnetometer will be able to measure the magnetic field strength and direction relative the axes of wings 24. The direction of the magnetic field has been mapped and can be used as a known parameter. The magnetometer reading is a measure of the angle between the magnetic field and each of the axes of body 12. The geometric representation of the steering device's longitudinal axis direction is a cone centered on the magnetic field direction and with a top angle equal to the angle measured by the magnetometer. A second cone may be described by measuring the gravity vector relative to body 12. This can be done by a tri-axial accelerometer. The final orientation of the axes of body 12 may be uniquely defined with the longitudinal axis aligned with the line of intersection between the pair of cones described, and the pitch and the roll as determined directly with the accelerometers.

As an alternative to the tri-axial accelerometer it is possible to use a simpler inclinometer or a gimbaled system, but the accuracy may degrade then. It is also possible to use one or more of the acoustic short baseline angle measurement, the differential pressure measurement and the inclinometer measurement in combination with the tri-axial magnetometer. Each measurement contributes the description of a cone as a representation of the steering device's longitudinal axis and can be utilized in any combination.

Similar to the discussion above the tri-axial accelerometer may be combined with one or more of the acoustic, pressure or magnetic compass, but not with a tri-axial magnetometer.

Inertial positioning devices may also provide coordinate estimates at two or more points in a rigid frame, either body 12 itself or a rigid frame parallel to body 12. Such positioning devices must be calibrated for any drift in their instrumentation.

Any combination of the above mentioned positioning methodologies could also be used to determine the steering body orientation.

Figure 3:
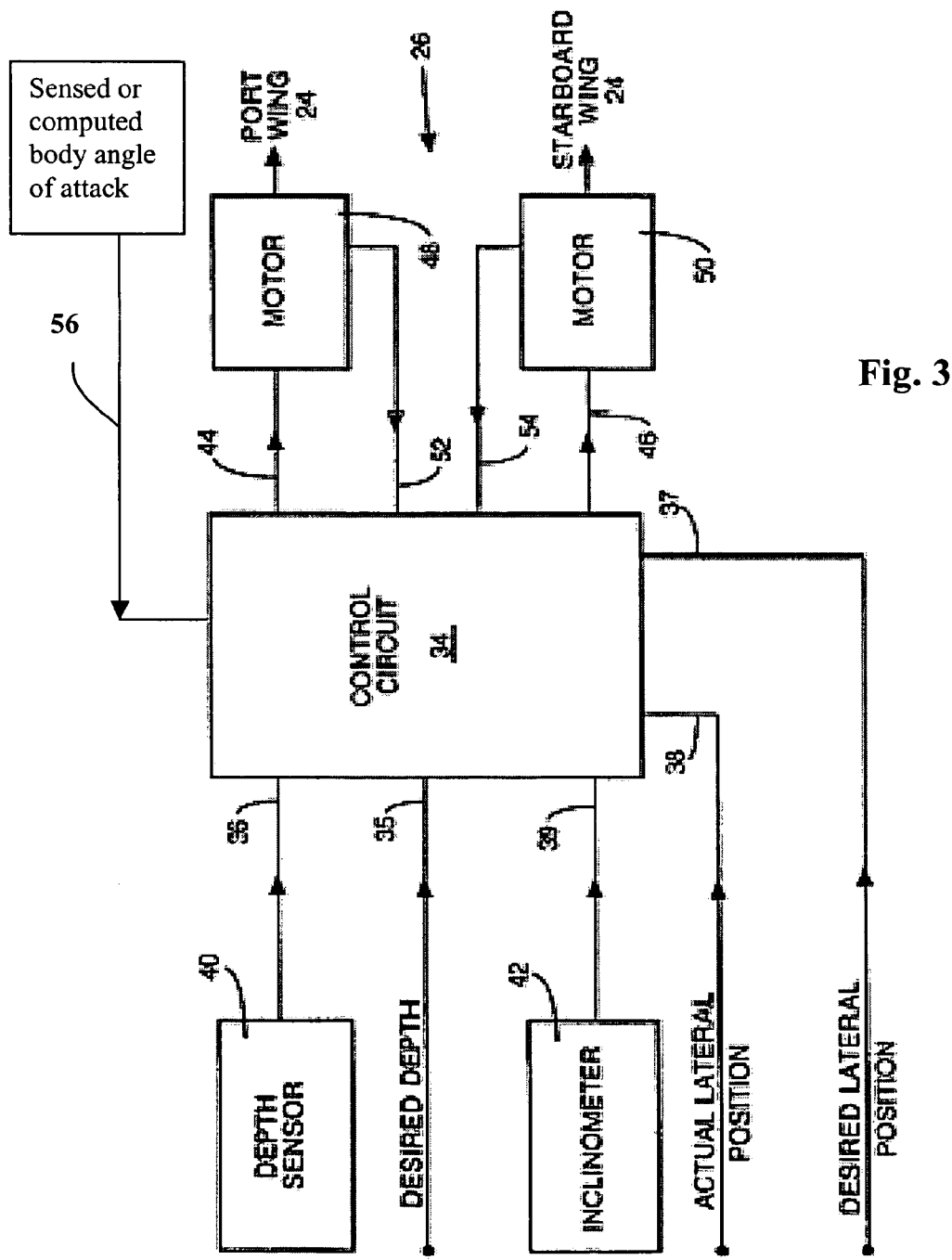
FIG. 3 illustrates a control scheme that may be utilized to control apparatus of the invention.

FIG. 3 is a schematic diagram of a control scheme 26 useful in the invention for controlling orientation members in apparatus and methods of the invention. In this embodiment, the control scheme comprises a microprocessor-based control circuit 34 having respective inputs 35 to 39 to receive control signals representative of desired depth, actual depth, desired lateral position, actual lateral position and roll angle of the bird 10 (i.e. the angular position of the body 12 in a plane perpendicular to the longitudinal axis of the streamer 14). The desired depth signal can be either a fixed signal corresponding to the aforementioned 10 meters, or an adjustable signal, while the actual depth signal is typically produced by a depth sensor 40 mounted in or on the bird 10. The lateral position signals are typically derived from a position determining system of the kind described in our U.S. Pat. No. 4,992,990 or our International Patent Application No WO9621163. The roll angle signal is produced by an inclinometer 42 mounted within the bird 10. The control circuit 34 has two control outputs 44, 46, connected to control respective electrical stepper motors 48, 50, each of which is drivingly connected to a respective one of the wings 24. The stepper motors 48, 50 have respective outputs at which they produce signals representative of their respective current angular positions (and therefore of the current angular positions of the wings 24), which outputs are connected to respective control inputs 52, 54 of the control circuit 34. In operation, the control circuit 34 receives between its inputs 35 and 36 a signal indicative of the difference between the actual and desired depths of the bird 10, and receives between its inputs 37 and 38 a signal indicative of the difference between the actual and desired lateral positions of the bird 10.

FIG. 4 illustrates another steerable bird modified in accordance with one embodiment 80 of the invention, with portions cut away to reveal certain features. Illustrated in FIG. 4 is a body 112 suspended from a streamer 14 by a rigid or semi-rigid member 110. Such steerable birds are sometimes referred to as "hanging birds". Two members 82 and 84 extend away from steerable bird body 12 at a known distance L and known angle, $\phi$, as in embodiment 60 of FIG. 2. Members 82 and 84 respectively support dual acoustic sensors 86 and 88. The steering device body 12 orientations may be determined since the length L and angle $\phi$ are known. Alternatively, acoustic sensors 86 and 88 may each be inside of body 12 of steering device 80. The differenced measurements from the acoustic devices 86 and 88 provide information about one angle of orientation and combined with other information as explained below the complete set of all three attitude angles may be resolved and thus give the orientation of body 12, the steering device body to which wings 24 are attached. Steering device body 12 may be assumed to be nearly horizontal in the common reference frame or so near to horizontal that the error from the incorrect assumption is negligible. Additional instrumentation to determine the vertical orientation may be added in the form of two or more pressure sensors, depicted at 92 and 96. Pressure sensor 92 is shown located near a front end 90 of body 12, while pressure sensor 96 is shown illustrated near an aft end 94. Pressure sensors 92 and 96 could either provide absolute pressure or pressure differences to measure the validity of the assumption. An inclinometer, 98, in bird body 12 may provide equivalent information. FIG. 4 shows acoustic sensors and pressure sensors both aligned with the longitudinal axis, although there exist many combinations of sensors and sensing strategies to determine orientation.

The actual lateral position of steerable birds may be determined for instance by using GPS combined with an acoustic positioning system, such as a short-baseline (SBL) or ultra-short baseline (USBL) acoustic systems. This information, combined with previously known 3-D coordinates of acoustic transmitters, is sufficient to calculate the positions of transmitters at the time of measurement. By further using the information about the measured distances and differences it is possible to calculate the position of an acoustic receiver on or near a bird that has received the signals. All receivers in or on a streamer cable, including receivers on birds, can this way be tracked for the purpose of deployment precision, increased operational safety, and increased efficiency.

The two difference signals for depth and lateral position, along with any feed-forward information received through input 32, any information about other orientation members N1, N2, etc., through input 33, and any supervisory control signals received from a supervisory controller through input 45 are used by the control circuit 34 to calculate the roll angle of the bird 10 and the respective angular positions of the wings 24 which together will produce the necessary combination of vertical force (upwardly or downwardly) and lateral force (left or right) required to move the bird 10 to the desired depth and lateral position. The control circuit 34 then adjusts each of the wings 24 independently by means of the stepper motors 48, 50, so as to start to achieve the calculated bird roll angle and wing angular positions. Knowledge of the angle of attack of body 12 of the steering device is obtained through one or more of the methods and apparatus detailed above, and indicated in the control scheme of FIG. 3 by feedback 56. This feedback is used to optimize the angular position of wings 24 and, ultimately, the angle of attack of body 12. Numerous variations in the control scheme are possible. Supervisory controllers, feed-forward controllers, and the like may be cascaded with control system 26. A feed-forward controller, as indicated by input 32 in FIG. 2, may utilize information about currents, wind, and other environmental conditions, in order to counteract for any deviations relative to the nominal that may be predicted to take place, and do so before the deviation actually takes place or to do so in an early stage of the deviation. An adaptive control scheme may also be used.

Systems of the invention may become unstable due to geometry of the streamers, the point of application of, and direction of the applied forces. This may cause orientation members to generate undesirable torque on a streamer. To remove this undesirable effect, control system 26 in FIG. 3 may be programmed appropriately. While adjusting the angular positions of wings 34N of orientation member N, control circuit 34 may continuously receive signals representative of the actual angular positions of wings 24 from the stepper motors 48, 50, as well as signals representative of the actual roll angles of orientation members N, N1, N2, etc., from an inclinometer 42 and input 33, and actual orientation of body 12, to enable control circuit 34 to determine and/or predict when the calculated wing angular positions, bird roll angle and angle of attack of body 12 have been or should be reached. And as the aforementioned difference signals at the inputs 35 to 38 of control circuit 34 reduce, control circuit 34 may repeatedly recalculate the progressively changing values of the roll angle an dangle of attack of orientation member N and the angular positions of the wings 34 required for orientation member N and streamer to reach the desired vertical and lateral position, until orientation member N and the streamer to which it is attached actually reach the desired vertical and lateral position. Body 12 of any particular orientation member may or may not rotate with respect to a streamer; if body 12 does not rotate it may then twist streamer 2 as it rolls. Streamers may resist this twisting motion, acting together as a kind of torsion spring that tends to return the orientation members to their normal position. However, this torsional action may or may not be beneficial and is not essential, and the orientation members may if desired be designed to rotate to a certain extent with respect to the axis of the streamer to which they are attached or a part of inline.

Orientation members useful in the invention may connect to at least one streamer in such a way that it is able to communicate with the outside world, which may be a vessel, satellite, or land-based device. The way this may be accomplished varies in accordance with the amount of energy the orientation members require and the amount of energy they may be able to store locally in terms of batteries, fuel cells, and the like. If the local storage capacity for batteries, fuels cells, and the like is sufficient, orientation members may be clamped onto the streamer skin at locations where there is located an inductor inside the streamer skin. Then any particular orientation member and its streamer can communicate through the skin with electrical impulses. If, on the other hand, an orientation member needs charging power from the streamer a different approach is required. In this case the orientation member may be mounted between two streamer sections and as such comprise an insert between two streamer sections, as described herein.

It is within the invention to combine systems of the invention with other position control equipment, such as source array deflecting members, and streamer deflectors. Some of these may include bridle systems, pneumatic systems, hydraulic systems, and combinations thereof.

As mentioned herein, materials of construction of orientation members and streamers useful in systems and methods of the invention may vary. However, there may be a need to balance the seismic equipment so that the system is balanced to be neutrally buoyant in the water, or nearly so, to perform its intended function. Polymeric composites, with appropriate fillers used to adjust buoyancy and mechanical properties as desired, may be employed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures. Thus, although a clamp-on bird and an inline bird may not be structural equivalents in that a clamp-on bird employs one type of fastener, whereas an inline bird employs a different fastener, in the environment of using birds to position streamers, a clamp-on bird and an inline bird may be equivalent structures.

What is claimed is:

1. A method comprising:
    (a) towing a marine seismic streamer having a longitudinal axis, and inline thereof a steerable bird including a body attached inline between two sections of the streamer and at least one control surface, the body having a longitudinal axis misaligned relative to the longitudinal axis of the streamer, fixed extensions extending from the body a known distance and angle, acoustic sensors integral with distal ends of the extensions, pressure sensors integral with the body, the sensors aligned with the body longitudinal axis, and a sensor for sensing roll of the body;
    (b) measuring parameters determinative of angle of attack of the body using the sensors; and
    (c) adjusting the at least one control surface based on the angle of attack of the body.

2. The method of claim 1 wherein the measuring further comprises a method selected from, a magnetic method, an inertial method, an inclination method, and combinations thereof.

3. The method of claim 1 comprising remotely controlling the at least one control surface, the at least one control surface being two removably attached to the bird body and controlled independently.

4. The method of claim 3 wherein the measuring comprises measuring an ocean current vector and a vessel motion vector to find the a water flow vector relative to the two moveable fins.

5. The method of claim 1 including measuring vertical orientation of the body.

6. The method of claim 5 wherein the measuring vertical orientation comprises measuring absolute pressure or pressure differential on the body.

7. The method of claim 5 wherein the measuring vertical orientation comprises measuring inclination of the body.

8. The method of claim 2 comprising using a tri-axial magnetometer removably attached to the body, and measuring the magnetic field strength and direction relative to axes of the body.

9. The method of claim 8 including measuring a gravity vector relative to the body axes.

10. The method of claim 2 wherein the measuring comprises using a tri-axial accelerometer.

11. The method of claim 9 wherein the gravity vector is measured using a device selected from a tri-axial accelerometer, an inclinometer, a gimbaling system, and combinations thereof.

12. An apparatus comprising:
(a) a seismic streamer having a longitudinal axis and inline thereof a steerable bird including a body attached inline between two sections of the streamer and at least one control surface, the body having a longitudinal axis misaligned relative to the longitudinal axis of the streamer;
(b) fixed extensions extending from the body a known distance and angle, acoustic sensors integral with distal ends of the extensions, pressure sensors integral with the body, the sensors aligned with the body longitudinal axis, and a sensor for sensing roll of the body, wherein the sensors yield measured parameters determinative of angle of attack of the body; and
(c) a controller for adjusting the at least one control surface based on the angle of attack of the body.

13. The apparatus of claim 12 wherein the means for sensing roll is selected from, a magnetic sensor, an inertial sensor, an inclinometer, and combinations thereof.

14. An apparatus comprising:
(a) a seismic streamer having a longitudinal axis and a steerable bird having a body attached inline between two sections of the streamer and at least one control surface, the body having a longitudinal axis misaligned relative to the longitudinal axis of the streamer;
(b) fixed extensions extending from the body a known distance and angle, acoustic sensors integral with distal ends of the extensions and aligned with the longitudinal axis of the body, and a non-acoustic sensor selected from the group consisting of a triaxial magnetometer and a triaxial accelerometer, wherein the sensors yield measured parameters determinative of angle of attack of the body;
(c) a controller for adjusting the at least one control surface based on the angle of attack of the body.

15. An apparatus comprising:
(a) a seismic streamer having a longitudinal axis and a steerable bird suspended therefrom including a body and at least one control surface, the body having a longitudinal axis misaligned relative to the longitudinal axis of the streamer;
(b) fixed extensions extending from the body a known distance and angle, acoustic sensors integral with distal ends of the extensions, pressure sensors integral with the body, the sensors aligned with the longitudinal axis of the body, and a sensor for sensing roll of the body, wherein the sensors yield measured parameters determinative of angle of attack of the body; and
(c) a controller for adjusting the at least one control surface based on the angle of attack of the body.

16. A method comprising:
(a) towing a marine seismic streamer having a longitudinal axis and a steerable bird suspended therefrom including a body and at least one control surface, the body having a longitudinal axis misaligned relative to the longitudinal axis of the streamer, fixed extensions extending from the body a known distance and angle, acoustic sensors integral with distal ends of the extensions, pressure sensors integral with the body, the sensors aligned with the longitudinal axis of the body, and a sensor for sensing roll of the body;
(b) measuring parameters determinative of angle of attack of the body using the sensors; and (c) adjusting the at least one control surface based on the angle of attack of the body.

17. The apparatus of any of claims 12 or 15 comprising an inertial positioning device integral with the body.

18. An apparatus comprising:
(a) a seismic streamer having a longitudinal axis and a steerable bird suspended therefrom including a body and at least one control surface, the body having a longitudinal axis misaligned relative to the longitudinal axis of the streamer;
(b) fixed extensions extending from the body a known distance and angle, acoustic sensors integral with distal ends of the extensions and aligned with the longitudinal axis of the body, and a non-acoustic sensor selected from the group consisting of a triaxial magnetometer and a triaxial accelerometer, wherein the sensors yield measured parameters determinative of angle of attack of the body; and
(c) a controller for adjusting the at least one control surface based on the angle of attack of the body.

19. The apparatus of any of claims 12, 14, 15 or 18 wherein the control surface comprises two movable, controllable fins.

* * * * *